(12) United States Patent
Karaali et al.

(10) Patent No.: US 6,182,028 B1
(45) Date of Patent: *Jan. 30, 2001

(54) METHOD, DEVICE AND SYSTEM FOR PART-OF-SPEECH DISAMBIGUATION

(75) Inventors: Orhan Karaali, Rolling Meadows; Andrew William Mackie, Schaumburg, both of IL (US)

(73) Assignee: Motorola, Inc., Schaumburg, IL (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/965,696

(22) Filed: Nov. 7, 1997

(51) Int. Cl.[7] ..................................................... G06F 17/27
(52) U.S. Cl. ................................................. 704/9; 704/10
(58) Field of Search .......................... 704/9, 10; 707/531, 707/532

(56) References Cited

U.S. PATENT DOCUMENTS

| | | | |
|---|---|---|---|
| 4,916,614 | * | 4/1990 | Kaji et al. ................................. 704/2 |
| 5,146,405 | | 9/1992 | Church . | |
| 5,383,120 | | 1/1995 | Zernick . | |
| 5,418,717 | * | 5/1995 | Su et al. ................................... 704/9 |
| 5,752,052 | * | 5/1998 | Richardson et al. ..................... 704/9 |
| 5,799,269 | * | 8/1998 | Schabes et al. .......................... 704/9 |

OTHER PUBLICATIONS

Bennello, Julian, Andrew W. Mackie, and James A. Anderson. 1989. Syntatic category disambiguation with neural networks. Computer Speech and Language 3: 203–217.

DeRose, Steven J. 1988. Grammatical category disambiguation by statistical optimization. Computional Linguistics 14 (1): 31–39.

Schmid, Helmut. 1994. Part–of Speech tagging with neural networks. In Proceedings, Fifteenth International Conference on Computational Linguistics, 172–176.

Kempe, Andre. 1994. Probabilistic tagging with feature structures. In Proceedings, Fifteenth International Conference on Computational Linguistics.

* cited by examiner

*Primary Examiner*—David R. Hudspeth
*Assistant Examiner*—Harold Zintel
(74) *Attorney, Agent, or Firm*—Darleen J. Stockley

(57) ABSTRACT

A method (300), device (408), and system (400) provide part-of-speech disambiguation for words based on hybrid neural-network and stochastic processing. The method disambiguates the part-of-speech tags of text tokens by obtaining a set of probabilistically annotated tags for each text token, determining a locally predicted tag for each text token based on the local context of the text token, determining an alternative tag for each text token based on the expanded context of the text token, and choosing between the locally predicted tag and the alternative tag when the locally predicted tag and the alternative tag are different.

11 Claims, 8 Drawing Sheets

METHOD, DEVICE AND SYSTEM FOR PART-OF-SPEECH DISAMBIGUATION

FIELD OF THE INVENTION

The present invention relates to part-of-speech disambiguation, and more particularly to combining neural-network and stochastic processors into a hybrid system to accomplish such disambiguation.

BACKGROUND OF THE INVENTION

Part-of-speech disambiguation is the process of assigning the correct part of speech to each word in a sentence, based on the word's usage in the sentence. For example, the part of speech of the English word "record" may be either noun or verb, depending on the context in which the word is used; in the sentence "John wants to record a record", the first occurrence of "record" is used as a verb and the second is used as a noun. The accurate recognition of this distinction is particularly important in a text-to-speech system, because "record" is pronounced differently depending on whether it is a noun or verb.

As shown in FIG. 1, numeral 100, to disambiguate the parts-of- speech of words in a text, part-of-speech disambiguation systems typically use the following three-step process. Step 1 is the tokenization step, in which a text stream (101) is tokenized into a sequence of text tokens (104) by a text tokenizer (102) as specified by a tokenization knowledge database (103). The tokenization knowledge database typically contains predetermined rules that are used to identify textual elements, which are classifiable by part of speech. Examples of such textual elements are words, punctuation marks, and special symbols such as "%" and "$". Step 2 is the lexicon access step, in which each text token is looked up in a lexicon (106) by a lexicon accessor (105). The lexicon consists of a static lexicon (107) that contains a plurality of textual elements and corresponding part-of-speech tags, and a dynamic lexicon (108) that can generate part-of-speech tags for the textual elements that are not stored in the static lexicon. Because some textual elements (e.g., the word "record") have more than one part of speech, the lexicon access step will result in at least one part-of-speech tag being assigned to each text token; the output of the lexicon access step is therefore a sequence of ambiguously tagged text tokens (109). Step 3 is the disambiguation step, in which all part-of-speech ambiguities in the sequence of ambiguously tagged text tokens are resolved by the disambiguator (110) as specified by the disambiguation knowledge database (111), thus resulting in a sequence of unambiguously tagged text tokens (112).

An example of the application of the above process is presented in FIG. 2, numeral 200. A text stream (201) is input into the tokenization step, which yields a sequence of untagged text tokens (202) as its output. The sequence of untagged text tokens is input into the lexicon access step, which yields a sequence of ambiguously tagged text tokens as its output. As may be seen in FIG. 2, several text tokens have more than one tag associated with them; for example, "wants" is an ambiguously tagged text token (204), because it may be used as either a plural noun (tag "NNS") or a third-person, present tense verb (tag "VBZ"). The set of all possible tag sequences based on the sequence of ambiguously tagged text tokens is represented by a directed acyclic graph of tag sequences (203). The sequence of ambiguously tagged text tokens is input into the disambiguation step, which determines a best path (205) through the directed acyclic graph of tag sequences, thus yielding a sequence of unambiguously tagged text tokens (206).

It is known in the art that local context is a strong indicator of a word's part of speech; hence stochastic systems based on the statistical modeling of word and tag collocations have proven successful. However, these systems fail predictably for syntactic structures that involve non-local dependencies. Because non-local dependencies are beyond the limits of stochastic systems, such effects must be accounted for by systems that can process expanded context. Two problems to be considered in developing such systems are: identifying and placing appropriate limits on the amount of expanded context to be processed, and balancing the contribution of the evidence provided by local and expanded context processing.

Hence, there is a need for a method, device and system for part-of-speech disambiguation that advantageously combines the processing of both local and expanded context.

DETAILED DESCRIPTION OF A PREFERRED EMBODIMENT

The present invention provides a method, device and system for disambiguating the parts of speech of words in a text by considering information from both local and expanded context. Consideration of expanded context provides improvement of the accuracy of methods relying on local context alone. The accurate disambiguation of the parts of speech of words is useful in a variety of text-processing and speech-synthesis applications.

Figure 1:
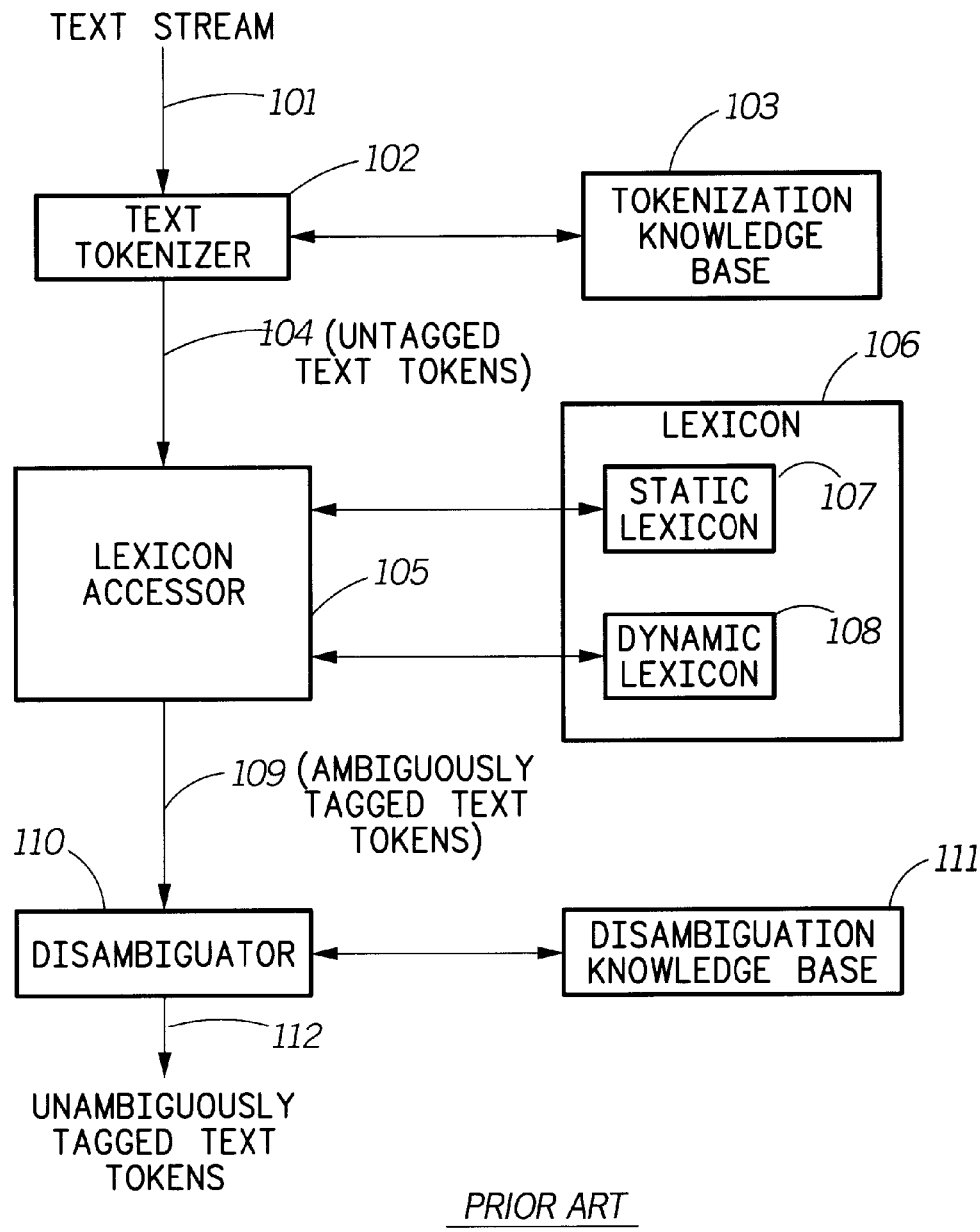
FIG. 1 is a schematic representation of a part-of-speech disambiguation system for disambiguating the parts-of-speech of text tokens as is known in the art.
Figure 2:
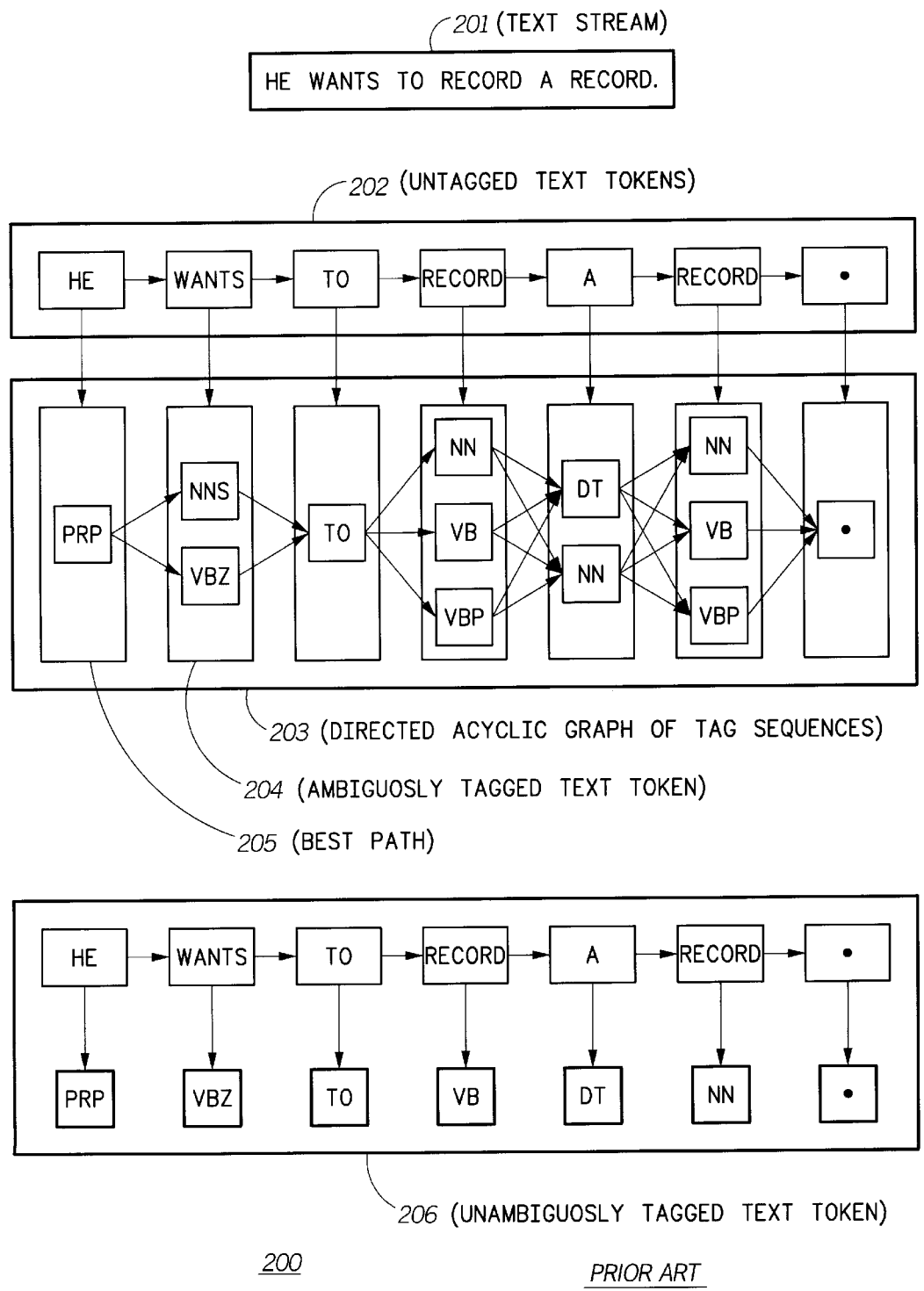
FIG. 2 is a schematic representation of the processing of an input text by the system of FIG. as is known in the art.
Figure 3:
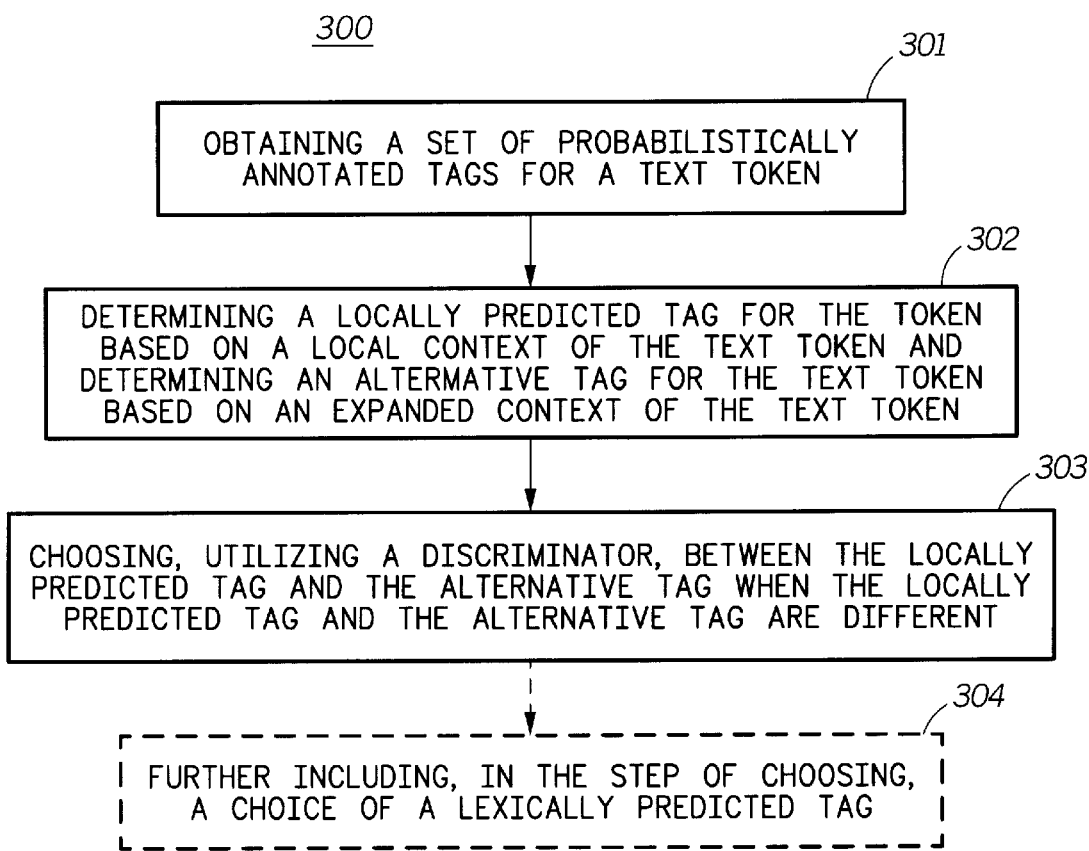
FIG. 3 is a flow chart of one embodiment of steps in accordance with the present invention, which performs part-of-speech disambiguation by evaluation of local and expanded context.

As shown in the steps set forth in FIG. 3, numeral 300, the method of the present invention provides, in response to text input, efficient generation of unambiguous part-of-speech tags for that text. The method includes the steps of: A) obtaining (301) a set of probabilistically annotated tags for a text token; B) determining (302) a locally predicted tag for the text token based on the local context of the text token and determining an alternative for the text token based on an expanded context of the text token; and C) choosing (303), using a discriminator, between the locally predicted tag and the alternative tag when the locally predicted tag and the alternative tag are different.

In step C, a choice of a lexically predicted tag may further be included. The lexically predicted tag is defined as the most probable tag for the text token.

The locally predicted tag is typically determined by using one of: A) a stochastic algorithm for part-of-speech disambiguation based on local context; B) a system of rules for part-of-speech disambiguation based on local context; C) a neural network trained to disambiguate parts-of-speech based on local context; D) a decision tree for part-of-speech disambiguation based on local context; E) a genetic algorithm for part-of-speech disambiguation based on local context; and F) a combination of at least two of A–E.

The alternative tag is generally determined by using one of: A) a system of rules for disambiguating parts-of-speech based on expanded context; B) a neural network trained to disambiguate parts-of-speech based on expanded context; C) a decision tree for part-of-speech disambiguation based on expanded context; D) a genetic algorithm for part-of-speech disambiguation based on expanded context; and E) a combination of at least two of A–D.

Figure 4:
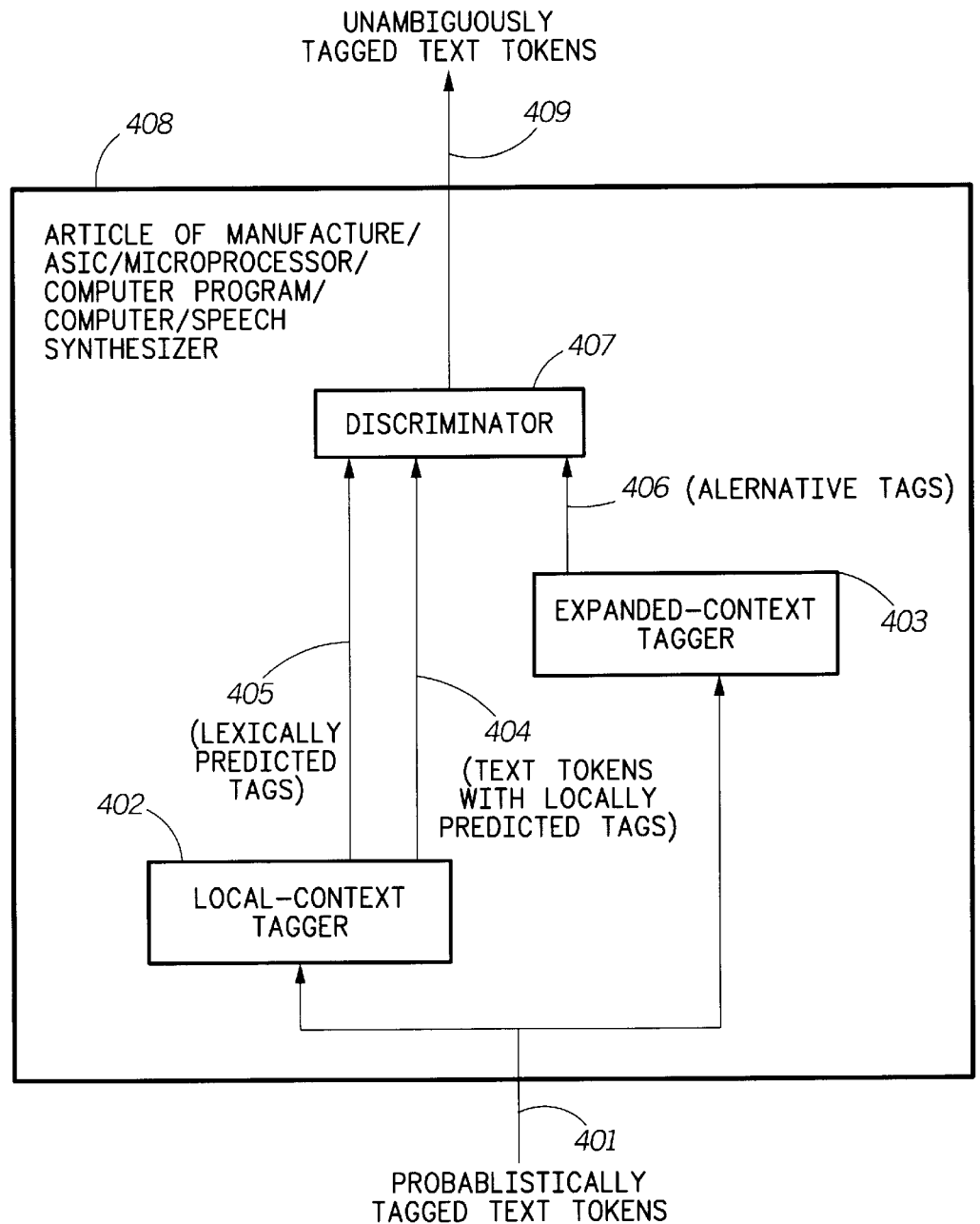
FIG. 4 is a schematic representation of one embodiment of a hybrid part-of-speech disambiguator that evaluates local and expanded context in accordance with the present invention.

FIG. 4, numeral 400, is a schematic representation of one embodiment of a device/system in accordance with the present invention, which disambiguates ambiguously tagged text tokens. The device/system (408) is typically an article of manufacture, an application specific integrated circuit (ASIC), a microprocessor, a computer program, a computer, a speech synthesizer or the like. The device/system (408) receives as input a sequence of probabilistically tagged text tokens (401) and produces as output a corresponding sequence of unambiguously tagged text tokens (409). The device/system typically consists of a local-context tagger (402), an expanded-context tagger (403), and a discriminator (407).

The local-context tagger (402) receives as input the sequence of probabilistically tagged text tokens and produces as output a sequence of lexically predicted tags (405) and a sequence of text tokens with locally predicted tags (404). Each probabilistically tagged text token has at least one tag; in the case that the probabilistically tagged text token has a tag set consisting of a plurality of tags, the local-context tagger performs two disambiguation operations on the tag set, as follows. First, a lexically predicted tag is chosen from the tag set based on lexical probability. Second, a locally predicted tag is chosen from the tag set based on local context. Both of these operations are examined further in the discussion of FIG. 5 below.

The expanded-context tagger (403) receives as input the sequence of probabilistically tagged text tokens and produces as output a sequence of alternative tags (406). Each probabilistically tagged text token has at least one tag; in the case that the probabilistically tagged text token has a tag set consisting of a plurality of tags, the expanded-context tagger chooses the alternative tag based on an evaluation of the expanded context of the text token. This operation is examined further in the discussion of FIG. 6 below.

The discriminator (407) receives as input the sequence of probabilistically tagged text tokens and the sequence of lexically predicted tags from the local-context tagger and the sequence of alternative tags from the expanded-context tagger and outputs a sequence of unambiguously tagged text tokens based on an evaluation of differences between the input tags as presented in the discussion of FIG. 8 below.

Figure 7:
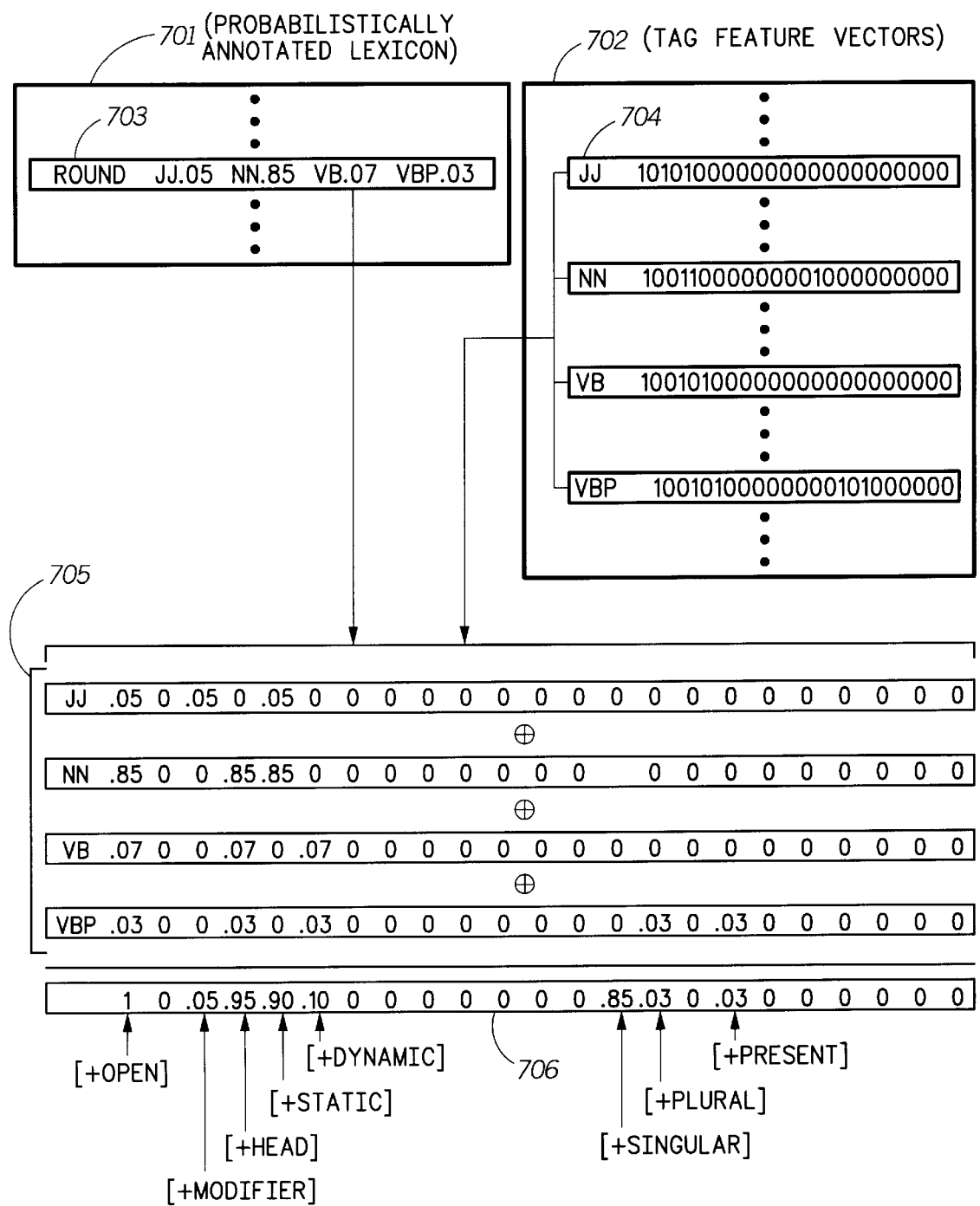
FIG. 7 is a schematic representation of one embodiment of the construction of probabilistically weighted tag feature vectors in accordance with the present invention.

Probabilistically tagged text tokens 401 is the input stream that is processed by both the local-context tagger 402 and the expanded-context tagger 403. A probabilistically annotated text token is constructed by annotating each token in the input stream with the probabilistically annotated tags stored in the probabilistically annotated lexicon 701, a sample record of which is shown in FIG. 7 as element 703.

Lexically predicted tags 405 is an output of the local-context tagger and is an input to the discriminator 407. Lexically predicted tags 405 is generated by examining the probabilistic annotations of the probabilistically tagged text tokens and choosing, for each text token, the most probable tag. Given and input stream of n text tokens, the corresponding stream of lexically predicted tags is n elements in length, with the $I^{th}$ element of the tag stream corresponding to the $I^{th}$ element of the stream of text tokens.

Text tokens with locally predicted tags 404 is an output of the local-context tagger and is one of the three input streams to the discriminator. Each of the input streams to the discriminator contains a sequence of tags, wherein for each input stream the sequence of tags is chosen by a tag disambiguation algorithm operating on the same sequence of probabilistically tagged text tokens. In addition, each tag in the stream of tags in text tokens with locally predicted tags 404 is associated with its corresponding text token.

Alternative tags 406 is the output of the expanded context tagger and is input to the discriminator. Alternative tags 406 is the same format as element 404 (i.e., as a stream of tags, each one of which corresponds to a text token in the input stream). Unambiguously tagged text tokens 409 is the output of the device/system 408 of the present invention, and corresponds to element 807 in FIG. 8 below. This is the sequence of input tokens, each of which is annotated by exactly one tag.

Figure 5:
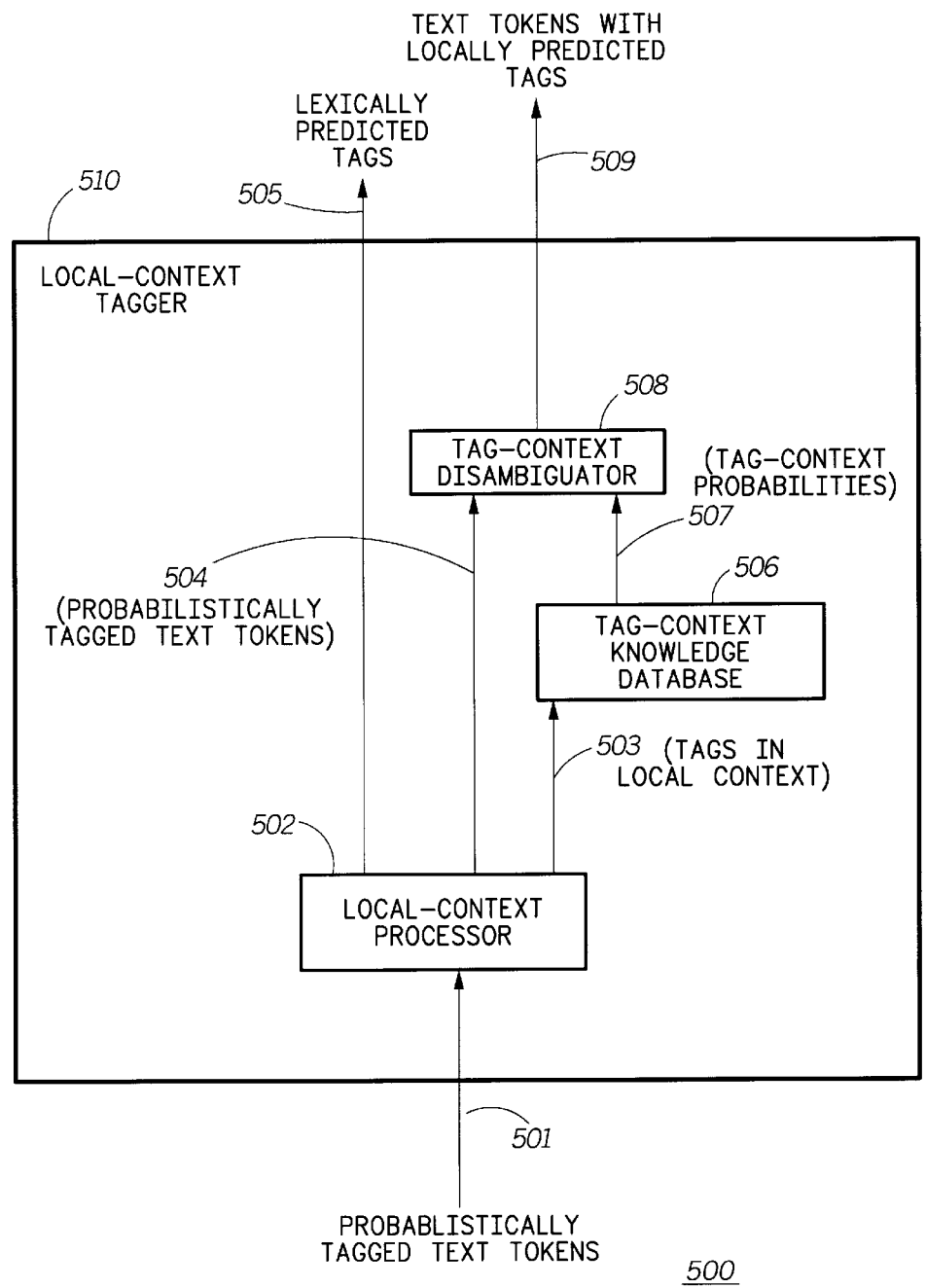
FIG. 5 is a schematic representation of one embodiment of a stochastic part-of-speech disambiguator that evaluates local context in accordance with the present invention.

FIG. 5, numeral 500, is a schematic representation of one embodiment of a device/system in accordance with the local-context tagger (510) of the present invention, which disambiguates probabilistically tagged text tokens according to the tokens' local context. The local-context tagger receives as input a sequence of probabilistically tagged text tokens (501) and produces as output a sequence of lexically predicted tags (505) and a sequence of text tokens with locally predicted tags (509).

A local-context processor (502) processes the probabilistically tagged text tokens and produces three output streams as follows. The first stream is a sequence of lexically predicted tags (505), which is generated by examining the probabilistic annotations of the probabilistically tagged text tokens and choosing, for each text token, the most probable tag. In the case of equally probable tags, a deterministic algorithm (e.g., sort order of tag codes) is employed to generate a single tag; this is to ensure that the discriminator can rely on deterministic input in this stream. The second stream is an annotated sequence of probabilistically tagged text tokens (504). The annotations add information of use to the specific local-context tagger algorithm used for disambiguation; e.g., capitalization facts, etc. Finally, the third stream is a set of tags in local context (503) for each text token. In the case of bigram-based stochastic disambiguation, these sets would consist of tag pairs corresponding to all possible collocations between the tags of two contiguous text tokens; e.g., if the first text token had n possible tags and the second text token had m possible tags, the cardinality of the set of tags in context would be mn.

The tag-context disambiguator (508) disambiguates the tag sets in the sequence of probabilistically tagged text tokens by using a predetermined local-context disambiguation algorithm, based on the tag-context probabilities (507)

provided by the tag-context knowledge database (506). For example, if the local-context disambiguation algorithm was bigram-based stochastic disambiguation, these probabilities would be the conditional probabilities of each tag in the tag set of the current text token when preceded by a tag in the tag set of the previous text token, as determined by corpus analysis. A Viterbi search is typically used to ensure that the calculation of the optimal path through the lattice of tag sets proceeds in linear time relative to the length of the path. The output of this process is a sequence of text tokens with locally predicted tags (509).

The neural network produces an output hypothesis vector based on its input vectors, Stream 2, Stream 3, and Stream 4 and the internal transfer functions used by the processing elements (PE's). The coefficients used in the transfer functions are varied during the training process to vary the output vector. The coefficients of the transfer functions are collectively referred to as the weights of the neural network, and the weights are varied in the training process to vary the output vector produced by given input vectors. The weights are set to small random values initially in the range of −0.01 and 0.01. The context description serves as an input vector and is applied to the inputs of the neural network. The context description is processed according to the neural network weight values to produce an output vector, i.e., the associated alternate tag representation. At the beginning of the training session, the associated alternate tag representation is not meaningful since the neural network weights are random values. An error signal vector is generated in proportion to the distance between the associated alternate tag representation and the assigned target alternate tag representation, Stream 1.

The error signal is calculated to be the raw distance between the associated alternate tag representation and the target alternate tag representation by, for example, using a Euclidean distance measure, shown in Equation 1.

Equation 1

$$E = \sum_k (d_k - o_k)^2 \qquad \text{Equation 1}$$

In Equation 1, "E" represents the error signal, and "d" and "o" are both k-dimensional vectors (i.e., each have k elements); "d" represents the "assigned target alternate tag representation" and "o" represents the "associated alternate tag representation" described above.

After computation of the error signal, the weight values are then adjusted in a direction to reduce the error signal. This process is repeated a number of times for the associated pairs of input context descriptions and assigned target alternate tag representations. This process of adjusting the weights to bring the associated alternate tag representation closer to the assigned target alternate tag representation is the training of the neural network. This training uses the standard back propagation of errors method. Once the neural network is trained, the weight values possess the information necessary to convert the context description to an output vector similar in value to the assigned target alternate tag representation. The preferred neural network implementation requires up to ten million presentations of the context description to its inputs and the following weight adjustments before the neural network is considered fully trained.

The neural network contains blocks with two kinds of activation functions, sigmoid and softmax, as are known in the art. The softmax activation function is shown in Equation 2 (where I is the input to the transfer function, which is the sum of all of the weighted inputs to the PE) and the sigmoid activation function is shown in Equation 3.

Equation 2

$$y_k = \frac{e^{I_k}}{\sum_{l=1}^{N} e^{I_l}} \qquad \text{Equation 2}$$

Equation 3

$$y_k = \frac{1}{1 + e^{-0.5 I_k}} \qquad \text{Equation 3}$$

In Equation 2 (softmax activation function) and Equation 3 (sigmoid activation function), "I" represents the input to the activation function and represents the sum of all of the weighted inputs to the PE ("processing element"). "I" is well known in the art.

Figure 6:
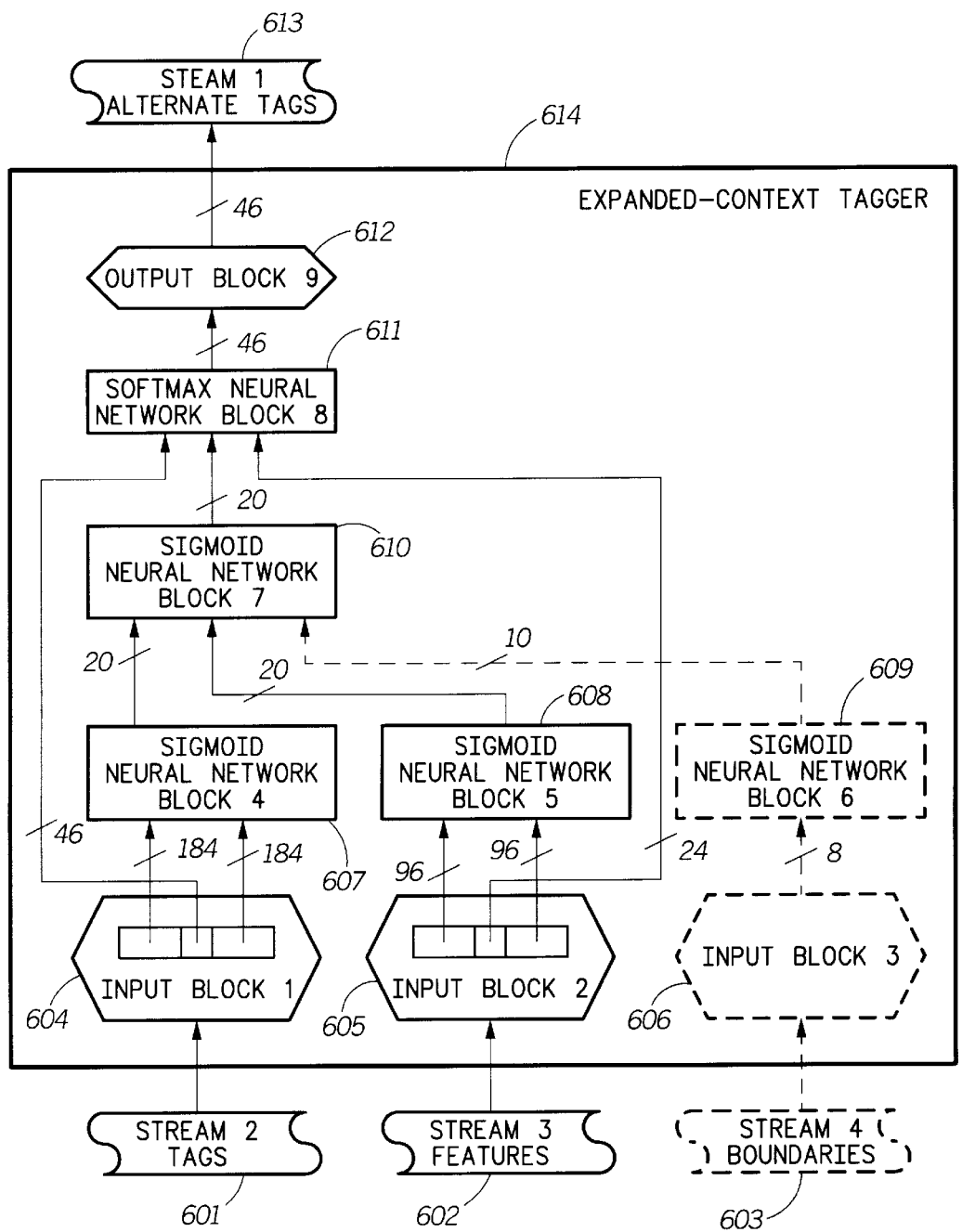
FIG. 6 is a schematic representation of one embodiment of a neural network part-of-speech disambiguator that evaluates expanded context in accordance with the present invention.

FIG. 6, numeral 600, illustrates the neural network architecture utilized by the present invention in a preferred embodiment. Stream 2 (601), the tags are fed into the input block 1 (604). The input block 1 (604) then extracts the expanded context, which, in the present embodiment, is defined as the four previous, the current, and four future tags. The input block 1 (604) passes the four previous and four future tags into neural network block 4 (607). There are 46 possible tags, which are coded with 1-of-n coding. The four previous tags produce 184 outputs (4*46). The four future tags produce another 184 outputs (4*46). The neural network block 4 (607), uses sigmoid transfer functions and has 20 Processing Elements (PEs). The neural network block 4 (607) passes its output to the neural network block 7 (610). The input block 1 (604) passes the current tag to the neural network block 8 (611).

Stream 3 (602), the features are fed into the input block 2 (605). The input block 2 (605) then extracts the four previous, the current, and four future features. The input block 2 (605) passes the four previous and four future features into neural network block 5 (608). There are 24 possible features and they are coded with m-of-n coding. The four previous features produce 96 outputs (4*24). The four future features produce another 96 outputs (4*24). The neural network block 5 (608), uses sigmoid transfer functions and has 20 Processing Elements (PEs). The neural network block 5 (608) passes its output to the neural network block 7 (610). The input block 2 (605) passes the current tag to the neural network block 8 (611).

Stream 4 (603), the boundaries are fed into the input block 3 (606). The input block 3 (606) then passes the boundaries into neural network block 6 (609). The neural network block 6 (609), uses sigmoid transfer functions and has 10 Processing Elements (PEs). The neural network block 6 (609) passes its output to the neural network block 7 (610).

The neural network block 7 (610), uses sigmoid transfer functions and has 20 Processing Elements (PEs). The neural network block 7 (610) passes its output to the neural network block 8 (611).

The neural network block 8 (611), uses softmax transfer functions and has 46 Processing Elements (PEs). The neural network block 8 (611) calculates and passes the most likely alternate tag to the output block 9 (612). The output block 9 (612), outputs the alternate tag to the stream 1 (613).

During the training phase of the expanded-context tagger (614), the stream 1 (613), the numeric encoding of the target alternate tags is fed into output block 9 (612). The output block 9 (612) calculates the error signal and backpropagates the error signal to the neural network block 8 (611). This error signal is then backpropagated into the neural network blocks 7 (610), 6 (609), 5 (608), and 4 (607).

During the backpropagation of error signal the weights of the neural network blocks are modified so that the error signal is reduced.

FIG. 7, numeral 700, is a schematic representation of one embodiment of the construction of probabilistically weighted tag feature vectors in accordance with the present invention. The probabilistically annotated lexicon (701) contains records (703) for each word in which are stored the tags that may be associated with the word, each of which is labeled with a probability of occurrence based on corpus analysis. In the example, the word "round" has been determined to occur 5% of the time in a reference corpus as an adjective (tag "JJ"), 85% of the time as a noun (tag "NN"), 7% of the time as a base form verb(tag "VB"), and 3% of the time as a present-tense, non-third person singular verb(tag "VBP").

The list of tag feature vectors (702) contains a tag feature vector for each of the 45 part-of-speech tags in the present embodiment. Each tag feature vector contains an N-element Boolean vector (N=23 in the present embodiment), each element of which is a single bit which indicates the presence (signified by "1") or absence (signified by "0") of a specific feature. For example, in the present embodiment, the first bit of the tag feature vector indicates whether or not the corresponding tag belongs to an open class; the second bit indicates whether or not the corresponding tag identifies a specifier; the third bit indicates whether or not the corresponding tag identifies a modifier; etc. Provided below are Tables 1 and 2 which provide a listing of tag feature vector for each of the 46 part-of-speech tags and 23 tag feature definitions of each of the N-elements in the Boolean vector.

In the present example, to construct the probabilistically weighted feature vector for the word "round", a probabilistically weighted feature vector is constructed for each of the tags of "round" based on the tag probabilities associated with "round" as derived from the reference corpus. Thus, in the example, the adjective tag ("JJ"), with a 5% probability of occurrence, results in a feature vector containing 0.05 in its first, third, and fifth positions (corresponding to the adjective tag's featural decomposition of [+open, +modifier, +static]).

The above process is applied to the four tags of "round", resulting in four probabilistically weighted feature vectors (705), which are then summed to yield the probabilistically weighted feature vector for the word "round" (706). The probabilistically weighted feature vector indicates the probabilities of occurrence of particular features of "round"; e.g., there is a 100% probability that (in the current example) the word "round" occurs as an open-class usage, and a 95% probability that "round" is a head (as opposed to a modifier (5%) or specifier (0%)). Similarly, there is a 90% probability that "round" is used statically (i.e., in a nominal construction) and 10% that "round" is used dynamically (i.e., in a verbal construction). The probabilistically weighted feature vector is presented to the neural network so that the network can train on a richer representation of the syntactic functionality of words than can be provided by tags alone.

Figure 8:
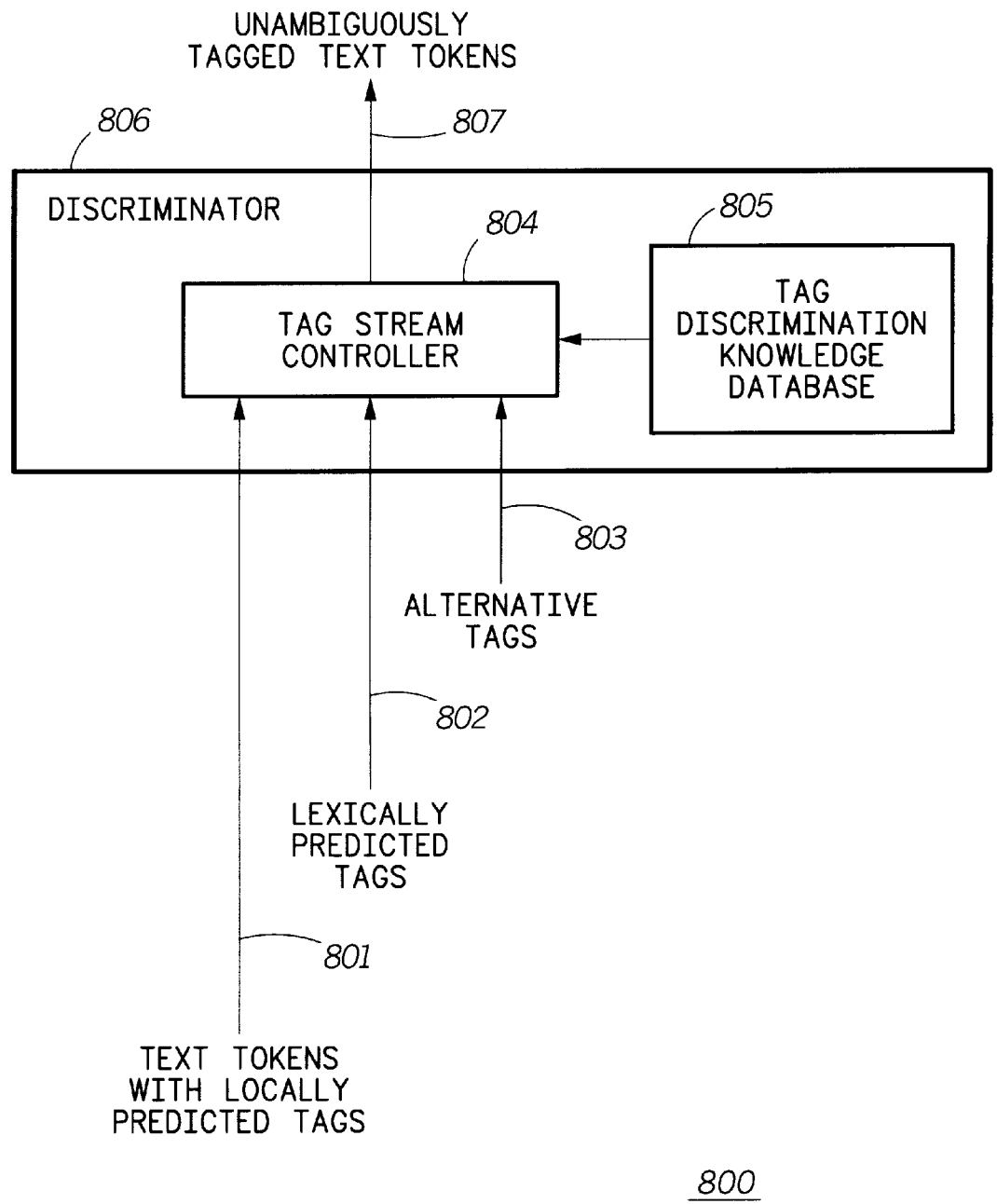
FIG. 8 is a schematic representation of one embodiment of a rule-based tag discriminator in accordance with the present invention.

FIG. 8, numeral 800, is a schematic representation of one embodiment of a device/system in accordance with the discriminator (806) of the present invention, which discriminates between the tags applied to a given text token by different disambiguation algorithms, based on the observed characteristics of the algorithms. The tag stream controller (804) of the discriminator receives as input a plurality of input streams, each of which contains a sequence of tags, wherein for each input stream the sequence of tags is chosen by a tag disambiguation algorithm operating on the same sequence of probabilistically tagged text tokens. In the present embodiment, the following three streams are used: the sequence of text tokens with locally predicted tags (801), the sequence of lexically predicted tags (802), and the sequence of alternative tags (803). In the case that a tag in at least one of the three streams fails to agree with the others for a given text token, an output tag is determined by discriminating among the plurality of tags, by reference to procedures stored in the tag discrimination knowledge database (805). In the present embodiment, the discrimination knowledge database contains a set of rules characterizing the accuracy of the different tagging algorithms relative to predetermined input. Alternatively, this information could be provided by a neural network trained on the observed behavior of the tagging algorithms. The output of the discriminator is a sequence of unambiguously tagged text tokens (807).

The method may be implemented by computer readable program code on a computer usable medium. Software implementing the method may be embedded in a microprocessor or a digital signal processor. The system may be embodied in a tangible medium having computer program code. Alternatively, an application specific integrated circuit (ASIC) may implement the method, or a combination of any of these implementations may be used. For example, the method may be implemented by a computer or a speech synthesizer.

Thus, the present invention may be embodied in an article of manufacture such as an application specific integrated circuit, a microprocessor, a computer program, a computer or a speech synthesizer which is used for disambiguating the parts-of-speech of text tokens. Where the article of manufacture includes a device for implementing a computer usable medium, the computer usable medium typically includes a computer readable program code thereon for implementing the following software routines. Alternatively, the article of manufacture may include hardware circuitry to implement the software routines. The hardware circuitry of the article of manufacture includes a local-context tagger (402), an expanded-context tagger (403) and a discriminator (407).

The local-context tagger (402) is coupled to receive a sequence of probabilistically tagged text tokens and is for determining a locally predicted tag for a text token based on a local context of the text token, as described more specifically above. The expanded-context tagger (403) is coupled to receive the sequence of probabilistically tagged text tokens and is used for determining an alternative tag for the text token based on an expanded context of the text token. The discriminator (407) is coupled to the local-context tagger and the expanded-context tagger, for choosing between a locally predicted tag and an alternative tag for the text token, where the locally predicted tag and the alternative tag are different.

The local-context tagger generally includes: a local-context processor (502), coupled to receive a sequence of probabilistically tagged text tokens, for determining the local context of the text token; a tag-context knowledge database (506), coupled to receive a sequence of tags in context, for determining tag-context probabilities; and a tag-context disambiguator (508), coupled to the local-context processor and the tag-context knowledge database, for determining the locally predicted tag for the text token based on the local context of the text token.

The discriminator generally includes: a tag-stream controller (804), coupled to receive a plurality of tag streams, for producing a sequence of unambiguously tagged text tokens; and a tag-discrimination knowledge database (805), coupled to the tag-stream controller, having a plurality of systems/computer readable codes/circuits for discriminating between tags provided by the plurality of tag streams.

Where the article of manufacture includes a computer program, a computer, or a speech synthesizer for disambiguating the parts-of-speech of text tokens, the article of manufacture has a computer usable medium with a computer readable program code thereon wherein the computer readable program code implements the steps of: A) determining a locally predicted tag for a text token based on a local context of the text token; B) determining an alternative tag for the text token based on an expanded context of the text token; and C) choosing, using a discriminator routine, between a locally predicted tag and an alternative tag for the text token, where the locally predicted tag and the alternative tag are different.

Determining a locally predicted tag generally includes: A) using a local-context routine, coupled to receive a sequence of probabilistically tagged text tokens, for determining the local context of the text token; B) using a tag-context knowledge database, coupled to receive a sequence of tags in context, for determining tag-context probabilities; and C) using a tag-context disambiguator, coupled to the local-context routine and the tag-context knowledge database, for determining the locally predicted tag for the text token based on the local context of the text token.

Choosing between a locally predicted tag and an alternative tag for the text token generally includes: A) using a tag-stream controller routine, coupled to receive a plurality of tag streams, for producing a sequence of unambiguously tagged text tokens; and B) using a tag-discrimination knowledge database, coupled to the tag-stream controller routine, having a plurality of systems/computer readable codes/circuits for discriminating between tags provided by the plurality of tag streams.

TABLE 1

Tag Feature Vectors: LDC Tagset

| Tag: | Feature Vector: | Description: |
| --- | --- | --- |
| # | 00100011100000000000000 | Pound sign |
| $ | 00100011100000000000000 | Dollar sign |
| " | 00000010100100000000000 | Open quotes |
| " | 00000010010100000000000 | Neutral quotes |
| " | 00000010001100000000000 | Close quotes |
| ( | 00000010100010000000000 | Left parenthesis |
| ) | 00000010001010000000000 | Right parenthesis |
| , | 00000010001000000000000 | Comma |
| . | 00000010001000000000000 | Period |
| : | 00000010011000000000000 | Colon |
| CC | 00000000010000000000000 | Coordinating conjunction |
| CD | 00101000000001100000000 | Cardinal number |
| DT | 01000000000000000000000 | Determiner |
| EX | 00011000000000000000000 | Existential there |
| FW | 10000000000000000000000 | Foreign word |
| IN | 00001000100000000000000 | Preposition or subordinating conjunction |
| JJ | 10101000000000000000000 | Adjective |
| JJR | 10101000000000000000010 | Comparative adjective |
| JJS | 10101000000000000000001 | Superlative adjective |
| LS | 00000001100000000000000 | List item |
| MD | 00100100100000000000000 | Modal auxiliary |

TABLE 1-continued

Tag Feature Vectors: LDC Tagset

| Tag: | Feature Vector: | Description: |
| --- | --- | --- |
| NN | 10011000000001000000000 | Singular or mass noun |
| NNP | 10011000000001000000100 | Singular proper noun |
| NNPS | 10011000000000100000100 | Plural proper noun |
| NNS | 10011000000000100000000 | Plural noun |
| PDT | 01000000100000000000000 | Predeterminer |
| POS | 00001000010000000001000 | Possessive marker |
| PRP | 00011000000001100000000 | Personal pronoun |
| PRP$ | 01001000100000000001000 | Possessive personal pronoun |
| RB | 10100100000000000000000 | Adverb |
| RBR | 10100100000000000000010 | Comparative adverb |
| RBS | 10100100000000000000001 | Superlative adverb |
| RP | 00000100001000000000000 | Adverb or particle |
| SYM | 00000001000000000000000 | Symbol |
| TO | 00000000100000000000000 | Prepositional or infinitival to |
| UH | 00010000000000000000000 | Interjection |
| VB | 10010100000000000000000 | Base-form verb |
| VBD | 10010100000001110000000 | Past-tense verb |
| VBG | 10010100000000001100000 | Gerund or present participle |
| VBN | 10010100000000010100000 | Past participle |
| VBP | 10010100000000101000000 | Present-tense, non-3rd singular verb |
| VBZ | 10010100000001001000000 | Present-tense, 3rd singular verb |
| WDT | 01000000000000000010000 | Wh-determiner |
| WP | 00011000000001100010000 | Wh-pronoun |
| WP$ | 01001000100000000011000 | Possessive wh-pronoun |
| WRB | 00100100000000000010000 | Wh-adverb |

TABLE 2

Tag Feature Definitions: LDC Tagset

| 1 [+open] | Open-class words (i.e., nouns, verbs, adjectives, and adverbs); assigned to all tags of the form NNx, JJx, RBx, and VBx (where "x" stands for optional additional characters), as well as the "foreign word" (FW) tag. |
| --- | --- |
| 2 [+specifier] | Specifiers (i.e., determiners, predeterminers, and possessive pronouns); assigned to the DT, PDT, PRP$, WDT, and WP$ tags. |
| 3 [+modifier] | Modifiers (e.g., adjectives and adverbs); assigned to all tags of the form JJx and RBx, as well as to the pound-sign, dollar-sign, CD, MD, and WRB tags. |
| 4 [+head] | Phrasal heads (e.g., nouns and verbs); assigned to all tags of the form NNx and VBx, as well as to the EX, PRP, UH, and WP tags. |
| 5 [+static] | Static usage (e.g., nouns and adjectives); assigned to all tags of the form JJx and NNx, as well as to the CD, EX, IN, POS, PRP, WP, and WP$ tags. |
| 6 [+dynamic] | Dynamic usage (e.g., verbs and adverbs); assigned to all tags of the form RBx and VBx, as well as to the MD, RP, and WRB tags. |
| 7 [+punctuation] | Punctuation usage; assigned to the nine punctuation tags (i.e., pound sign, the three "quotes" tags, the two parenthesis tags, comma, period, and colon). |
| 8 [+symbol] | Symbolic usage; assigned to the LS and SYM tags, as well as to the pound-sign and dollar-sign tags. |
| 9 [+beginning] | Indicates that the tag tends to occur at the beginning of a constituent; assigned to the IN, LS, MD, PDT, PRP$, TO, and WP$ tags, as well as to the pound-sign, dollar-sign, left-parenthesis, and open-quotes tags. |
| 10 [+middle] | Indicates that the tag tends to occur in the middle of a constituent; assigned to the comma, colon, and CC tags. |
| 11 [+end] | Indicates that the tag tends to occur at the end of a constituent; assigned to the POS and RP tags, as well as to the period, colon, close quotes, and right parenthesis tags. |
| 12 [+quote] | Differentiates quotation marks from other punctuation marks; assigned to the three "quotes" tags. |

TABLE 2-continued

Tag Feature Definitions: LDC Tagset

| | | |
|---|---|---|
| 13 [+parenthesis] | Differentiates parentheses from other punctuation marks; assigned to the two parenthesis tags. | |
| 14 [+singular] | Singular agreement (of noun and verb forms). Note that if a tag is marked both [+singular] and [+plural] it will agree with either a singular or plural form; if it is marked both [−singular] and [−plural], it does not require agreement at all. Assigned to the CD, NN, NNP, PRP, VBD, VBZ, and WP tags. | |
| 15 [+plural] | Plural agreement (of noun and verb forms). Assigned to the CD, NNPS, NNS, PRP, VBD, VBP, and WP tags. | |
| 16 [+past] | Past tense (of verb forms only). Assigned to the VBD and VBN tags. | |
| 17 [+present] | Present tense (of verb forms only). Assigned to the VBG, VBP, and VBZ tags. | |
| 18 [+participle] | Participial usage (of verb forms only). Assigned to the VBG and VBN tags. | |
| 19 [+wh-word] | Signifies usage as a "wh-word" (e.g., the interrogative pronouns "who" and "whom", etc.) Assigned to all tags of the form Wx. | |
| 20 [+possessive] | Possessive usage. Assigned to the POS, PRP$, and WP$ tags. | |
| 21 [+proper] | Differentiates proper nouns from all other nouns. Assigned to the NNP and NNPS tags. | |
| 22 [+comparative] | Comparative usage (of adjectives and adverbs). Assigned to the JJR and RBR tags. | |
| 23 [+superlative] | Superlative usage (of adjectives and adverbs). Assigned to JJS and RBS tags. | |

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method for providing unambiguous part-of-speech tags to text tokens in an input text, comprising the steps of:
   A) obtaining a set of probabilistically annotated tags for a text token;
   B) determining a locally predicted tag for the text token based on a local context of at least one tag of another text token adjacent to the text token and determining an alternative tag for the text token based on an expanded context of the text token consisting of tags, features and boundaries; and
   C) choosing, utilizing a discriminator, between the locally predicted tag and the alternative tag when the locally predicted tag and the alternative tag are different.

2. The method of claim 1 further including a choice of a lexically predicted tag in Step C, wherein the lexically predicted tag is the most probable tag for the text token.

3. The method of claim 1 wherein the locally predicted tag is determined by using one of:
   A) a stochastic algorithm for part-of-speech disambiguation based on local context;
   B) a system of rules for part-of-speech disambiguation based on local context;
   C) a neural network trained to disambiguate parts-of-speech based on local context;
   D) a decision tree for part-of-speech disambiguation based on local context;
   E) a genetic algorithm for part-of-speech disambiguation based on local context; and
   F) a combination of at least two of A–E.

4. The method of claim 1 wherein the alternative tag is determined by using one of:
   A) a system of rules for disambiguating parts-of-speech based on expanded context;
   B) a neural network trained to disambiguate parts-of-speech based on expanded context;
   C) a decision tree for part-of-speech disambiguation based on expanded context;
   D) a genetic algorithm for part-of-speech disambiguation based on expanded context; and
   E) a combination of at least two of A–D.

5. The method of claim 1 wherein the choice between the locally determined tag and the alternative tag is determined by using one of:
   A) a system of rules to discriminate between tags based on observed characteristics of a local-context tagger and an expanded-context tagger;
   B) a neural network trained to discriminate between tags based on observed characteristics of the local-context tagger and the expanded-context tagger;
   C) a decision tree trained to discriminate between tags based on observed characteristics of the local-context tagger and the expanded-context tagger;
   D) a genetic algorithm trained to discriminate between tags based on observed characteristics of the local-context tagger and the expanded-context tagger; and
   E) a combination of at least two of A–D.

6. An article of manufacture/computer program/computer/speech synthesizer for disambiguating the parts-of-speech of text tokens, having a computer usable medium with a computer readable program code thereon wherein the computer readable program code implements the steps of:
   A) determining a locally predicted tag for a text token based on a local context of at least one tag of another text token adjacent to the text token;
   B) determining an alternative tag for the text token based on an expanded context of the text token consisting of tags, features and boundaries; and
   C) choosing, using a discriminator routine, between the locally predicted tag and the alternative tag for the text token, when A locally predicted tag and the alternative tag are different.

7. The article of manufacture/computer program/computer/speech synthesizer of claim 6 wherein determining a locally predicted tag includes:
   A) using a local-context routine, coupled to receive a sequence of probabilistically tagged text tokens, for determining the local context of the text token;
   B) using a tag-context knowledge database, coupled to receive a sequence of tags in context, for determining tag-context probabilities; and
   C) using a tag-context disambiguator, coupled to the local-context routine and the tag-context knowledge database, for determining the locally predicted tag for the text token based on the local context of the text token.

8. The article of manufacture/computer program/computer/speech synthesizer of claim 6 wherein choosing between a locally predicted tag and an alternative tag for the text token includes:
   A) using a tag-stream controller routine, coupled to receive a plurality of tag streams, for producing a sequence of unambiguously tagged text tokens; and
   B) using a tag-discrimination knowledge database, coupled to the tag-stream controller routine, having a plurality of systems/computer readable codes/circuits for discriminating between tags provided by the plurality of tag streams.

9. An article of manufacture/application specific integrated circuit/microprocessor for disambiguating the parts-of-speech of text tokens, comprising:

A) a local-context tagger, coupled to receive a sequence of probabilistically tagged text tokens, for determining a locally predicted tag for a text token based on a local context of at least one tag of another text token adjacent to the text token;

B) an expanded-context tagger, coupled to receive the sequence of probabilistically tagged text tokens, for determining an alternative tag for the text token based on an expanded context of the text token consisting of tags, features and boundaries; and C) a discriminator, coupled to the local-context tagger and the expanded-context tagger, for choosing between the locally predicted tag and the alternative tag for the text token, when the locally predicted tag and the alternative tag are different.

10. The article of manufacture/application specific integrated circuit/microprocessor of claim 9 wherein the local-context tagger comprises:

A) a local-context processor, coupled to receive a sequence of probabilistically tagged text tokens, for determining the local context of the text token;

B) a tag-context knowledge database, coupled to receive a sequence of tags in context, for determining tag-context probabilities; and C) a tag-context disambiguator, coupled to the local-context processor and the tag-context knowledge database, for determining the locally predicted tag for the text token based on the local context of the text token.

11. The article of manufacture/application specific integrated circuit/microprocessor of claim 9 wherein the discriminator comprises:

A) a tag-stream controller, coupled to receive a plurality of tag streams, for producing a sequence of unambiguously tagged text tokens; and B) a tag-discrimination knowledge database, coupled to the tag-stream controller, having a plurality of systems/computer readable codes/circuits for discriminating between tags provided by the plurality of tag streams.

* * * * *